UNITED STATES PATENT OFFICE.

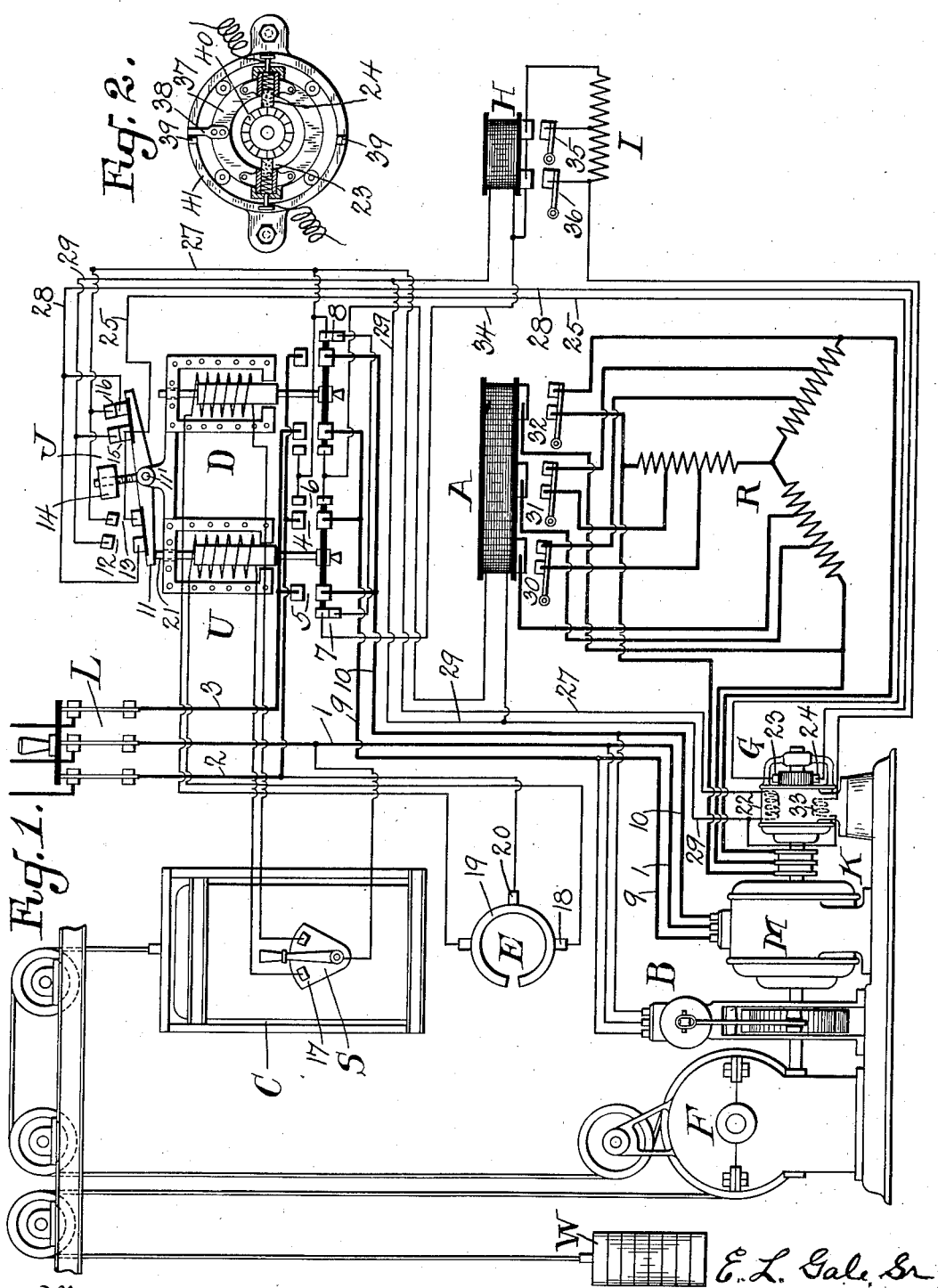

ERNEST L. GALE, SR., OF YONKERS, NEW YORK, ASSIGNOR TO OTIS ELEVATOR COMPANY, OF JERSEY CITY, NEW JERSEY, A CORPORATION OF NEW JERSEY.

MOTOR-CONTROLLING SYSTEM.

1,069,061.

Specification of Letters Patent. Patented July 29, 1913.

Application filed November 18, 1911. Serial No. 660,980.

*To all whom it may concern:*

Be it known that I, ERNEST L. GALE, Sr., a citizen of the United States, residing at Yonkers, in the county of Westchester and State of New York, have invented a new and useful Improvement in Motor-Controlling Systems, of which the following is a specification.

My invention relates to controlling systems for electric motors and is particularly adapted to the control of an alternating current hoisting or elevator motor but it is applicable to the control of electric motors in general.

One of the objects of my invention is the provision of simple and efficient means for automatically effecting the acceleration of an alternating current motor according to the load and speed.

Another object of the invention is the provision of means for retarding the motor in stopping and for automatically varying the retardation so as to meet all conditions of load and speed.

A further object of the invention is the provision of a dynamo electric machine coupled to the hoisting motor and arranged automatically to control the latter both in starting and stopping.

Other objects will appear hereinafter, the novel combinations of elements being pointed out in the appended claims.

In the accompanying drawing, Figure 1 represents diagrammatically my invention applied to an electric elevator system; Fig. 2 represents a modification of the electric generator shown in Fig. 1.

It is well known to those versed in electrical matters that the use of an alternating current system of distribution is being more widely used every day owing to certain advantageous characteristics it possesses over the older system of direct current distribution and for this reason alternating current motors are used for power purposes to a very large extent. One of the chief difficulties in connection with the operation of alternating current motors and particularly where such motors are used for hoisting purposes or for driving elevators is that no efficient and practical method has been devised for effecting a retardation of the motor in stopping. In the case of direct current motors this difficulty is readily overcome since a direct current motor will act as a generator when driven by the load and by permitting the same to send current through a resistance element any desired degree of retardation may be had, the energy consumed being given out as heat. This method which has proven very effective in the case of direct current motors is not available where alternating current motors are used since the commercial alternating current motor will not act as a self exciting dynamo. For this reason it has been found necessary to employ a heavy and powerful spring applied friction brake and to rely entirely on this for slowing down and stopping the motor. While this arrangement answers the purpose fairly well where the motor is of small size, it is far from satisfactory when used with a motor of appreciable size such as is required to drive an elevator since the rotor of an elevator motor is normally heavy and of high peripheral speed which places an excessive duty on the mechanical brake in stopping and has thus limited the size and speed of the motor which could be brought to rest within the limiting conditions of satisfactory elevator service and has in consequence limited the speed of elevator cars operated by alternating current motors. Furthermore it has been proven in practice that the severe duty which the mechanical brake must perform makes it necessary continually to adjust the same owing to excessive wear on the brake shoes or bands. The invention which I am about to describe overcomes this inherent lack of dynamic braking effect in alternating current motors by employing a direct current generator mechanically coupled to the alternating current motor and using the current generated thereby to effect the desired dynamic braking action, and means actomatically to regulate or control the retardation due to this dynamic brake to suit varying conditions of load and speed and I further purpose to utilize the current from the generator for effecting the automatic control of the motor in starting and accelerating to full normal speed.

Referring to the drawings, M designates an alternating current hoisting motor which is connected through the usual worm gear transmission contained in the gear casing F to the elevator car C. The ordinary counterbalance or back drum weight is shown at W.

The electrically released mechanical brake apparatus is designated by B while G represents a direct current generator which is mechanically coupled to the motor M and driven thereby. The motor M is provided with sliprings K which are connected to a starting resistance R controlled by an accelerating magnet A. A hand switch S in the car is used to start, stop and reverse the hoisting motor through the reversing switches U and D. At the top of the reversing switches is shown a switch J which is for the purpose of reversing the armature connections of the generator G every time its direction of rotation is changed, the switch J being operated by the reversing switches. A slow down magnet H controls a resistance I in the field circuit of the generator and it is operated by current from the generator during the period of stopping.

E represents a stop motion switch whose function is to effect the stopping of the hoisting machinery when the car reaches its limit of travel in either direction. A main line switch L connects the system with any suitable source of alternating current supply.

In order to operate the elevator car in an upward direction, the handle of the switch S is moved to the left until it electrically engages the contact 17. A circuit is thereby closed to the magnet winding of the reversing switch U this circuit being traced from the main 1, through the car switch contact 17, magnet winding of switch U, contact 18 of the stop motion switch E, contact ring 19, and by contact 20 to the main 2. The reversing switch U being now energized will operate to raise its core and close the contacts 5, 4 and 6, thereby establishing a circuit to the motor M through the conductors 9, 1 and 10 and to the releasing magnet of the brake B. It will be observed that when the reversing switch U is energized and its core moves upwardly the projection 21 carried by the core rocks the lever 11 of switch J about its pivot 11' and thereby closes the contacts 12 and 13 respectively which in turn establish an electrical connection between the brushes 23 and 24 of the generator G and the terminals of the generator shunt field 22. This circuit may be traced from the brush 23 to and through the contacts 13 by wire 25 and by the wire 27 to one terminal of the field winding 22. The other brush 24 is connected through the wire 28, contacts 12 and wire 29 to the opposite field terminal, hence it is seen that the field of the generator is connected across the generator armature through the switch J. The closing of the reversing switch contacts 6 connects the winding of the accelerating magnet A across the generator armature through the conductors 29 and 27. Under these conditions the motor M starts to rotate and move the elevator car upwardly, its speed being limited by the resistance R which is connected in the rotor circuit through the sliprings K. As the motor starts, the generator will act as a self-exciting dynamo and will supply current to the accelerating magnet A, the potential of this generated current increasing as the speed of the motor M increases until the magnet A becomes sufficiently energized to raise the switch 30 thereby short circuiting a portion of the resistance R. This results in an increase in motor speed followed by an increase in potential on the generator circuit which enables the magnet A to operate the switch 31 and short circuit a further portion of the starting resistance R. The motor now further increases its speed and the magnet A operates the switch 32 to short circuit the remainder of the starting resistance whereupon the hoisting motor assumes full speed with short circuited rotor and the car is raised at normal running speed. As the car approaches its upward limit of travel the stop motion ring 19, which is operated by the usual traveling nut carried on the drum shaft starts to rotate in an anti-clockwise direction until just as the car reaches its upward limit the ring rotates out of electrical engagement with the contact 18, thereby interrupting the circuit from the mains 1 and 2 to the magnet winding of the reversing switch. The latter immediately becomes deënergized and opens the motor and brake releasing circuits at the contacts 5 and 4 and at the same time interrupts the circuit from the generator to the accelerating magnet A at the contacts 6 and this magnet becomes deënergized and permits the switches 30, 31 and 32 to open and thereby remove the short circuit around the resistance R and placing it in proper condition for again starting the motor. Upon the deënergization of the reversing switch magnet the contacts 7 were closed and the generator is thereby connected to the stopping magnet H and to a stopping field 33 and resistance I in series therewith. This stopping field circuit may be traced from the generator brush 23, wire 25, contacts 13 of switch J, wire 27, contacts 8 and 7 of the reversing switches, wire 34, resistance I, stopping field 33, wire 29, contacts 12 of switch J, and by wire 28 to the generator brush 24. The magnet H is at the same time connected across the generator armature through the conductors 34 and 29. A current dependent upon the speed of the motor M now flows through the stopping field and resistance I and the generator exerts a strong retarding effect on the motor. The retarding action of this external power consuming device will depend upon the speed of the motor but will not be directly proportional to the speed since the voltage of the generator will be built up more rapidly than the increase in speed of the generator owing to the increase in field strength as well as to the increase in speed of the armature. This will result in an increase of the retarding action in a greater ratio than the increase in speed of the motor. But the retarding action required to bring the moving parts to rest within a given distance also increases at a greater ratio than the increase of speed in said parts. This increased retarding action of the generator is therefore advantageous in bringing the parts uniformly to rest within a given distance even when the speed of the motor is affected by the load. The generator may be designed to produce this variation in any desired degree, such variation being reduced to a minimum by having a shunt winding producing a saturated magnetic field.

The magnet H which controls the resistance I is connected across the generator brushes and is therefore controlled directly by the generator. This magnet will operate to close the switches 35 and 36 in the order named to short circuit more or less of the resistance I and thereby reduce the resistance in the stopping field circuit and permitting a greater current to flow, thus increasing the dynamic brake action. The action of the magnet H is entirely automatic and the amount of resistance cut out thereby depends on the speed of the motor M, the magnet H effecting a graduated braking effect which is particularly desirable in the case of fast running elevators.

By the use of the generator arranged and connected as shown it has been found that the mechanical brake may be of comparatively moderate power or just a little more than sufficient to hold the motor against movement when stopped and prevent it from being rotated backward by the load since the generator will bring the motor running at full speed substantially to rest. One great advantage of this is to permit the use of a relatively small mechanical brake since its duty is very light and consequently its life is long and it is subjected to little wear.

I have pointed out the stopping of the apparatus by means of the stop motion switch E but it will be observed that the operator in the car can by means of the switch S stop the car at any point in its travel by bringing it back to central or "off" position. The action is the same as already pointed out except that the reversing switch magnet will be deënergized at the contacts of the switch S instead of the contacts of the stop motion switch.

The operation of the reversing switch D is effected by moving the car switch lever in a right hand direction, thereby closing a circuit to the magnet winding of said switch and the latter will establish the motor circuit precisely as the switch U did excepting that the leads 9 and 10 will be interchanged or reversed so as to cause the motor to reverse its direction of rotation and cause the elevator car to descend.

As before pointed out, the switch J is for the purpose of maintaining the polarity of the generator field the same regardless of the direction of rotation of the motor and this switch is thrown from one side to the other by the operation of the reversing switches. The weight 14 is carried past the center 11 whenever the switch is thrown over and its function is to maintain the contacts 12, 13 or 15, 16, respectively, in closed relation.

Another method of maintaining the polarity of the generator the same is illustrated in the modification shown in Fig. 2. Here the generator brushes 23 and 24 are carried by a ring 37 which is arranged to rotate in a frame 41 secured to the motor. The ring 37 carries a stop piece 38 which engages fixed stops 39, 39 spaced substantially 180° apart. Should the motor rotate in a clockwise direction, the friction of the brushes 23 and 24 on the commutator 40 will cause the ring 37 to rotate with it until the stop piece 38 engages the lower stop 39, the brush 23 now occupying the position formerly occupied by the brush 24. It is self evident that the interchange of brushes due to a reversal of rotation will maintain the polarity of the field the same under all conditions.

It is to be understood that the switches controlled by the accelerating and stopping magnets A and H respectively, may be as numerous as desired, the greater the number of switches used the greater the refinement of operation will be. Therefore I desire not to be limited to any particular number of switches such as is shown. Furthermore I have for the sake of illustration shown a three phase system of alternating current, but my invention is not confined to any particular phase and may be used if so desired with a direct current system of circuits.

What I claim as new and desire to have protected by Letters Patent of the United States is:—

1. The combination with a motor, of a generator mechanically coupled thereto, a resistance in the circuit of said generator, means for closing said circuit, and means operative upon the closure of said circuit to reduce said resistance an amount controlled by the speed of the motor.

2. The combination with a motor, of a generator operatively connected thereto, resistance in the circuit of said generator, means for closing said circuit, and means controlled by said generator and responsive to variation in the speed of the generator for varying said resistance.

3. The combination with a motor, of a generator operatively connected thereto, a resistance in the circuit of said generator, means for closing said circuit, and means controlled by said generator for automatically effecting a gradual reduction of said resistance.

4. The combination with a motor, of a generator driven thereby, an additional field for said generator, and means controlled by the generator for regulating the strength of said additional field, and thereby regulating the retarding action of the generator on the motor.

5. The combination with an alternating current motor, of a generator driven thereby, a plurality of field windings for said generator, a switch for closing a circuit to said motor when in one position and for closing a circuit from the generator through one of the generator fields when in another position, and means for automatically varying the generator current through said field.

6. The combination with an alternating current motor, of a compound wound generator driven thereby, a resistance in one of the field windings of said generator, and means controlled by the generator for gradually varying said resistance, and thereby controlling the action of the generator on the motor.

7. The combination with an alternating current motor, of a dynamic brake therefor comprising a generator coupled to the motor, a field winding arranged to excite said generator whenever the same is rotated, an additional field winding for said generator, and means controlled by said generator for varying the strength of said additional field to effect a graduated brake action on the motor.

8. The combination with an alternating current motor, of a generator driven thereby, resistances in the motor and generator circuits, and means automatically controlled by the generator for varying both of said resistances to effect a graduated start and stop of said motor.

9. The combination with an alternating current motor, of a dynamic brake therefor comprising a generator driven thereby, resistances in the motor and generator circuits, and independent means controlled by said generator for effecting the gradual short circuiting of said resistances to start and stop the motor.

10. The combination with an alternating current motor, of a dynamic brake therefor comprising a generator driven by the motor, resistances in the motor and generator circuits, and separate means controlled by current from said generator for automatically short-circuiting said resistances gradually to start and stop said motor substantially as described.

11. The combination with an alternating current motor, of a generator driven thereby, reversing switches for closing the circuit to a field winding of said generator, an additional field winding for said generator, contacts on said reversing switches for closing a circuit to said additional field winding when the reversing switches are in a position to open circuit the motor, and means controlled by the generator for varying the strength of said additional field to effect a graduated retarding action on the motor.

12. The combination with an alternating current motor, of a dynamic brake therefor comprising a generator driven by said motor, automatic means operated by the generator for effecting the acceleration of the motor, and independent means controlled by the generator for automatically regulating the dynamic brake action of the generator on the motor in stopping.

13. The combination with an alternating current motor and a supply circuit therefor, of a dynamic brake for the motor comprising a generator driven by the motor, means for controlling the starting and stopping of said motor, a switch operated by said controlling means and adapted to maintain the polarity of the generator field the same regardless of the direction of rotation of the motor, an additional field winding for said generator which is open circuited during the operation of the motor, means controlled by said motor controlling means for closing the circuit of said additional field winding to effect a slowing down of the motor when the latter is disconnected from the supply circuit, and automatic means controlled by the generator for varying the resistance of the circuit of said additional field winding.

14. The combination with an alternating current motor, of a dynamic brake therefor comprising a direct current generator adapted to rotate with the motor, reversing switches for said motor, a switch for said generator controlled by said reversing switches and adapted to control the direction of current flow through a field winding of the generator, and automatic speed controlled means to vary the resistance of the generator field circuit and thereby vary the dynamic braking action.

15. In an elevator, the combination of a hoisting motor therefor, electro-responsive devices for controlling said motor, a generator connected to rotate with the motor, an additional field winding for the generator, and means controlled by the generator for regulating the strength of said additional field and thereby regulating the retarding action of the generator on the motor.

16. In an elevator, the combination of an alternating current hoisting motor, a generator driven thereby, resistances in the motor and generator circuits, and means automatically controlled by the generator for varying both of said resistances to effect a gradual start and stop of said hoisting motor.

17. In an elevator, the combination of an alternating current hoisting motor, of a dynamic brake therefor comprising a generator driven by the motor, resistances in the motor and generator circuits, and separate means controlled by current from said generator for automatically short-circuiting said resistances gradually to start and stop the hoisting motor, substantially as described.

18. In an elevator, the combination of an alternating current hoisting motor, of a dynamic brake therefor comprising a generator driven by said motor, automatic means operated by the generator for effecting the acceleration of the motor, and independent means controlled by the generator for automatically regulating the dynamic brake action of the generator on the hoisting motor in stopping.

In testimony whereof, I have signed my name to this specification in the presence of two subscribing witnesses.

ERNEST L. GALE, Sr.

Witnesses:
   EDWARD H. STEELE,
   GEORGE D. ROSE.